(No Model.)
B. F. RIX.
HARROW.
No. 301,163. Patented July 1, 1884.
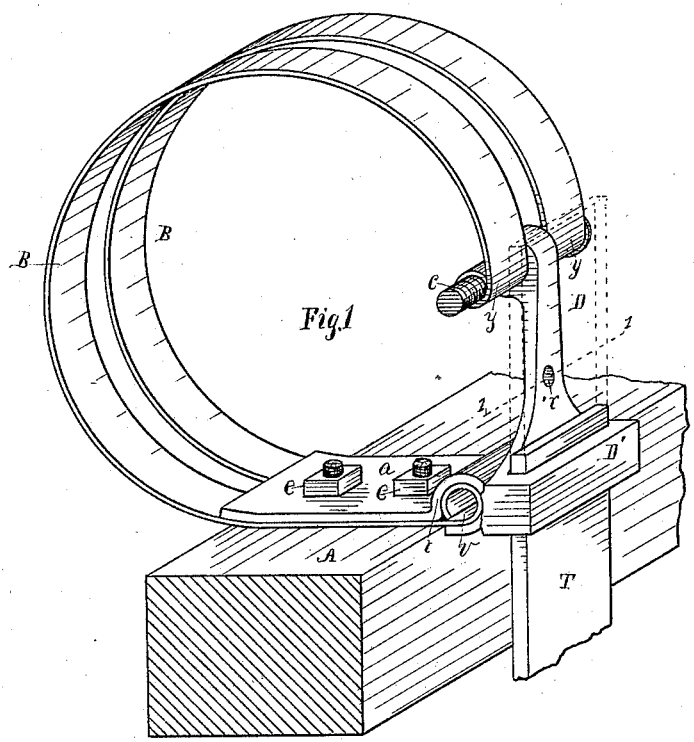
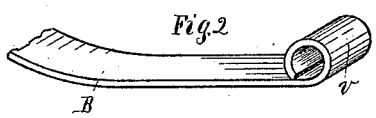
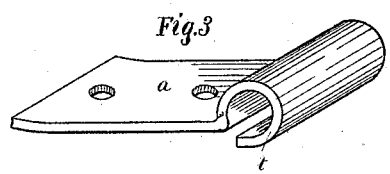
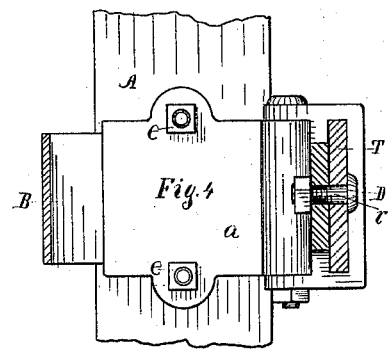
Attest:
John C. Perkins.
Jno. C. Bloom.
Inventor:
Benjamin F. Rix.
By Lucius C. West
Atty-

UNITED STATES PATENT OFFICE.

BENJAMIN F. RIX, OF KALAMAZOO, MICHIGAN.

HARROW.

SPECIFICATION forming part of Letters Patent No. 301,163, dated July 1, 1884.

Application filed November 20, 1883. (No model.)

*To all whom it may concern:*

Be it known that I, BENJAMIN F. RIX, a citizen of the United States, residing at Kalamazoo, county of Kalamazoo, State of Michigan, have invented a new and useful Improvement in Harrows, of which the following is a specification.

The object of my invention is to effect certain improvements in that class of harrows in which hinged teeth or shares are acted upon by a spring.

In the drawings forming a part of this specification, Figure 1 is a perspective view of a construction embodying my invention; Figs. 2 and 3, details in enlarged perspective; and Fig. 4 is a top view of Fig. 1 slightly changed, with parts in section on line 1 1 in Fig. 1.

A illustrates the tooth-beam of a harrow-frame, D D' a hinged tooth support or holder, and T the upper and secured end of a tooth or share, all of common construction. In connection with these parts or with substantially like parts, I find it of great advantage to use more than a single spring to impart an elastic effect to the hinged tooth. Two springs are preferable, (a greater number may be used,) each having a like relation to the hinged tooth or to the hinged tooth-support with which the tooth is connected, Fig. 1. The springs B B are provided with a loop, $y$, in the upper end and a loop, $v$, in the lower end, Figs. 1 and 2. The securing-plate $a$, Fig. 3, has a loop, $t$, adapted to surround the loop $v$ of the spring. In securing this plate to the beam A the springs B B are located between said plate and beam, and the latter secured together by bolts $e\ e$. Thus the combined loops $v\ v$ and $t$ form a strong and simple hinging-eye for the connection therewith of the tooth-support D D', Fig. 4, and the springs are firmly held from drawing out, breaking, or wabbling in their seat. A pivot-bolt, $c$, connects the springs with the upper end of the tooth or tooth-support. When the bolts $e\ e$ and the support D are located in relation to the springs B B as in Fig. 1, said parts $e\ e$ and D form means for holding the springs separated. If preferred, the springs may be close together, with the bolts $e\ e$ outside, Fig. 4, and the upper end of the tooth-support be made forked and pivotally connected with bolt $c$ on the outside of the springs. The binding or securing plate $a$ may be used to hold a single spring B, as in Fig. 4. The body of the plate $a$ may be made double and the spring be located between the two leaves; or said body may be placed between the spring and the tooth-beam by turning the loop $t$ the other way, and another plate or bar be bolted over the springs. All these changes, some of which are not here shown, but which will be readily understood by those skilled in the art, are deemed equivalent uses of my improved features of construction.

It will appear obvious that a tooth or share may be provided with hinging-eyes or hinging means, and the tooth-support be dispensed with, as in prior constructions.

What I claim as novel, and desire to secure by Letters Patent, is the following combinations of parts, substantially as specified, to wit:

1. The combination, with a hinged tooth and a spring or springs provided with the lower loop, of a securing-plate provided with a loop adapted to surround the loop of said spring or springs, these combined loops forming an eye for the hinged connection of said tooth.

2. The combination, with the springs, of a hinged tooth or tooth-support separating the upper end of the springs, a securing-plate forming a hinging-eye, and securing-bolts separating the springs at the lower end.

In testimony of the foregoing I have hereunto subscribed my name in the presence of two witnesses.

BENJAMIN F. RIX.

Witnesses:
E. R. D'ARCAMBAL,
D. K. BUCKHOUT.